United States Patent [19]

Malinge et al.

[11] Patent Number: 4,725,127

[45] Date of Patent: Feb. 16, 1988

[54] ELECTROMAGNETICALLY OPERATED OPTICAL SWITCH

[75] Inventors: Jean-Louis Malinge, Sevres; Philippe Pouyez, Colombes, both of France

[73] Assignee: Amphenol Corporation, Wallingford, Conn.

[21] Appl. No.: 915,193

[22] Filed: Oct. 3, 1986

[30] Foreign Application Priority Data

Oct. 4, 1985 [FR] France ............................... 85 14764

[51] Int. Cl.⁴ ...................... G02B 26/02; G02B 26/08; G02B 5/08
[52] U.S. Cl. .................................... 350/269; 350/266; 350/272; 350/486; 350/487; 350/632
[58] Field of Search ............... 350/266, 269, 272, 486, 350/487, 632

[56] References Cited

U.S. PATENT DOCUMENTS 4,202,602  5/1980  Torres ................................. 350/269

FOREIGN PATENT DOCUMENTS 0128800 12/1984 European Pat. Off. .
55-130505 10/1980 Japan .
2083648  3/1982 United Kingdom .

Primary Examiner—John K. Corbin
Assistant Examiner—Vincent J. Lemmo
Attorney, Agent, or Firm—Bacon & Thomas

[57] ABSTRACT

The invention relates to electromagnetically commanded optical switches and in particular to access couplers to a series bus. The subject of the invention is an optical switch of the movable mirror type which has an electromagnet which, under the influence of a command signal, permits the displacement of a slider supporting the mirror (31) and a magnetic circuit (46, 47, 30) permitting the displacement of the slider to take place parallel to a plane of reference (P) in the zone of switching.

17 Claims, 14 Drawing Figures

FIG_1
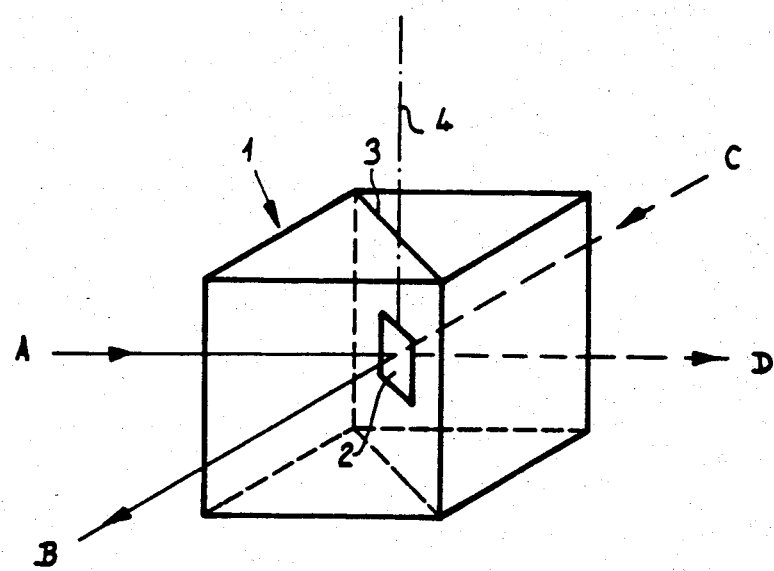
FIG_2
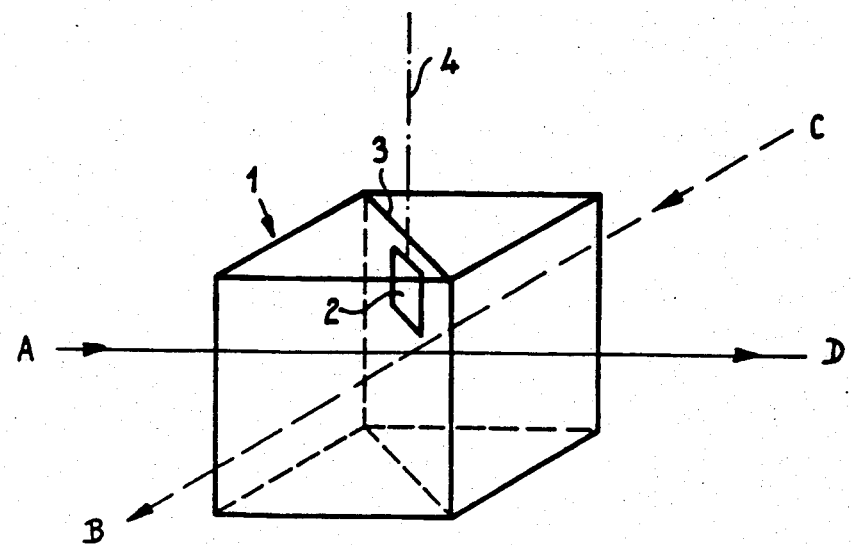

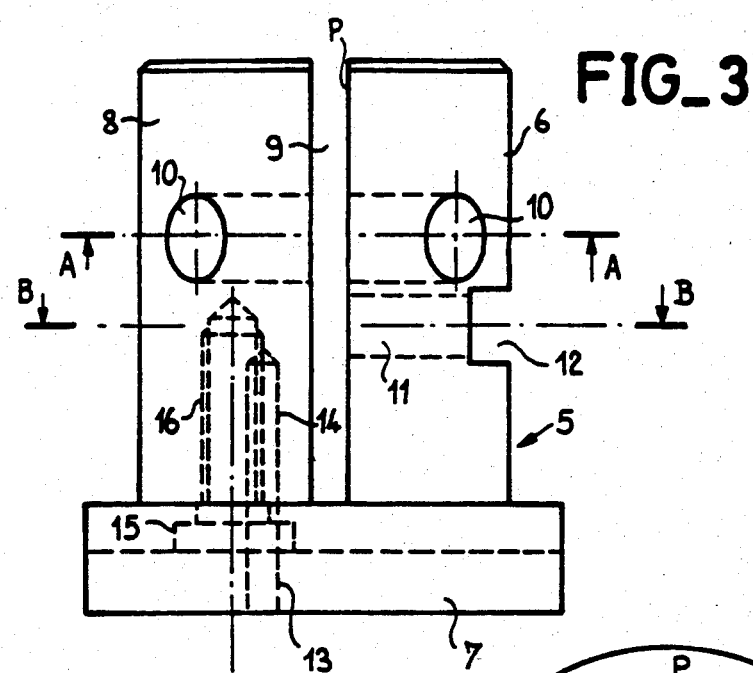
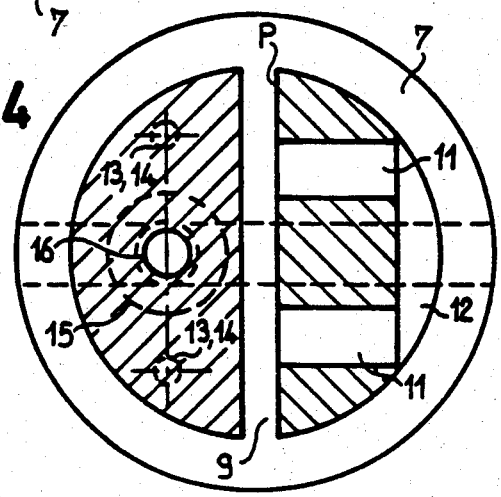
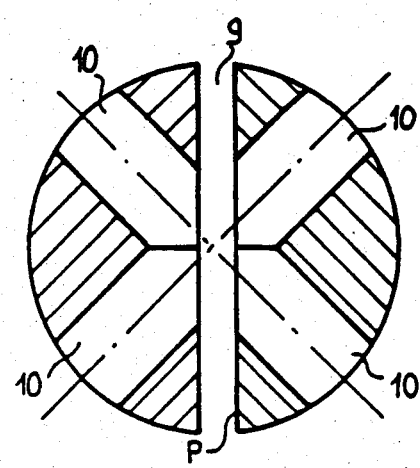

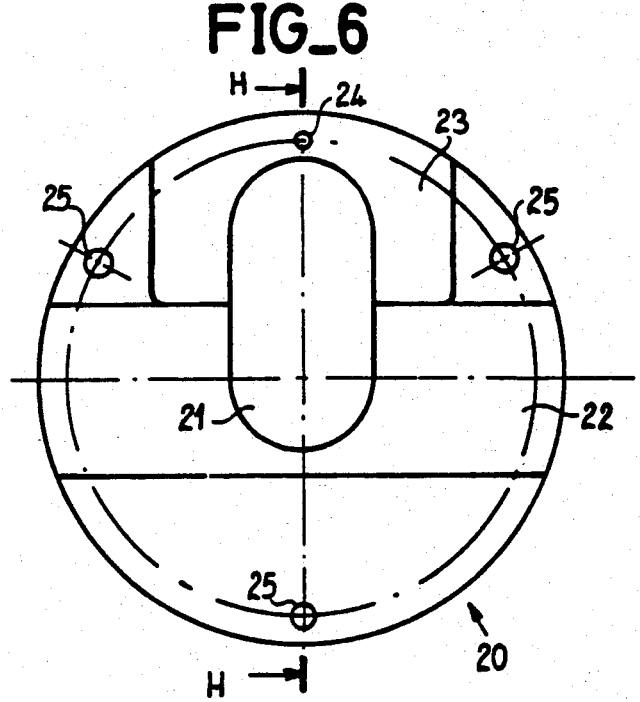
FIG_6
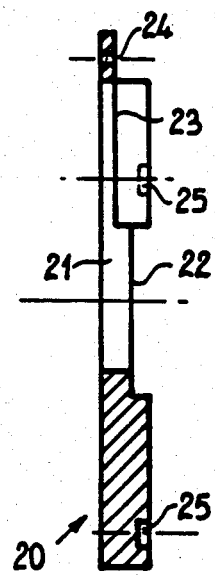
FIG_7
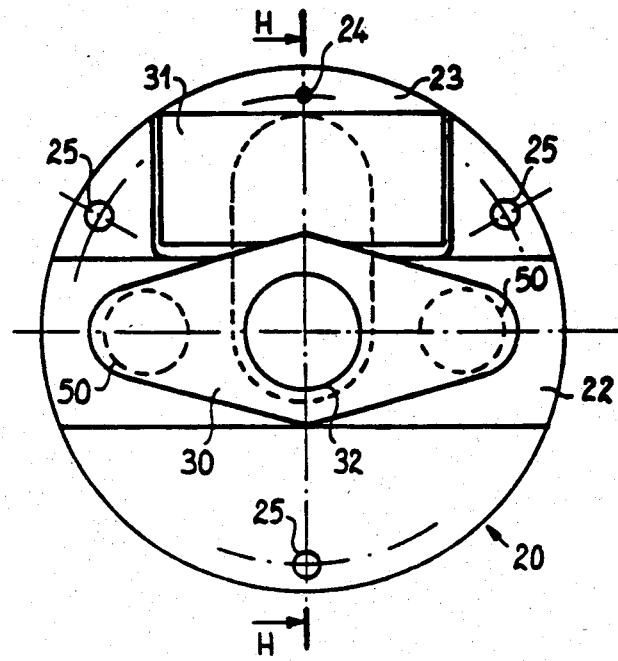
FIG_8
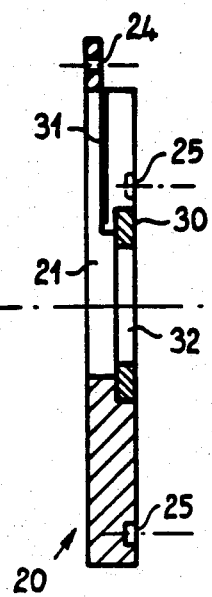
FIG_9

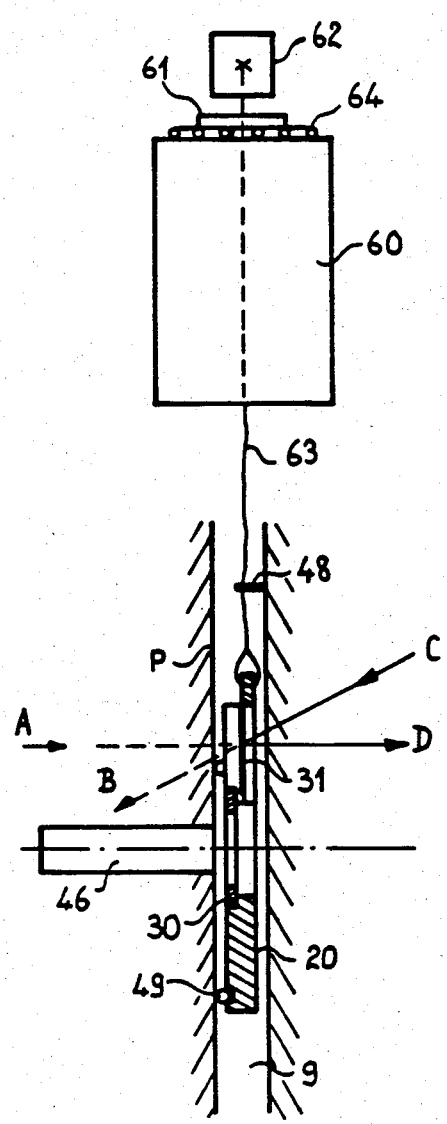
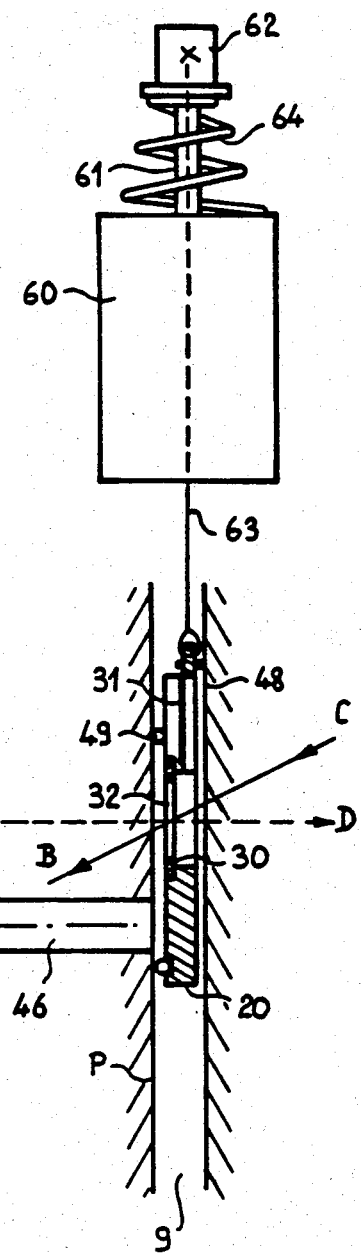

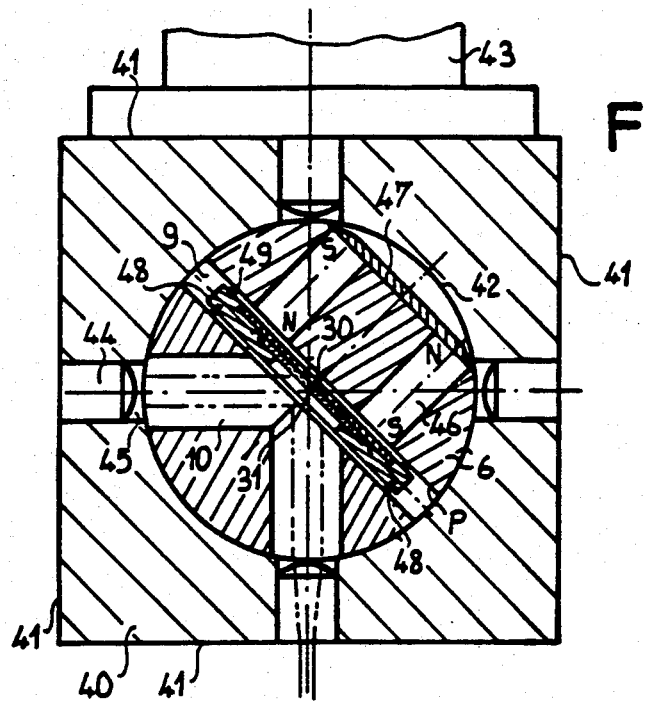
FIG_10
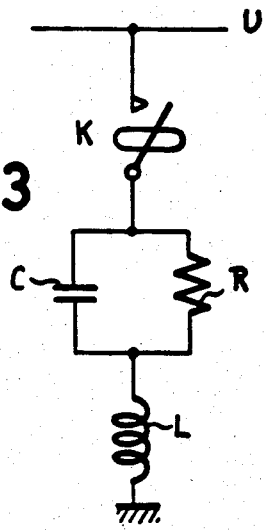
FIG_13
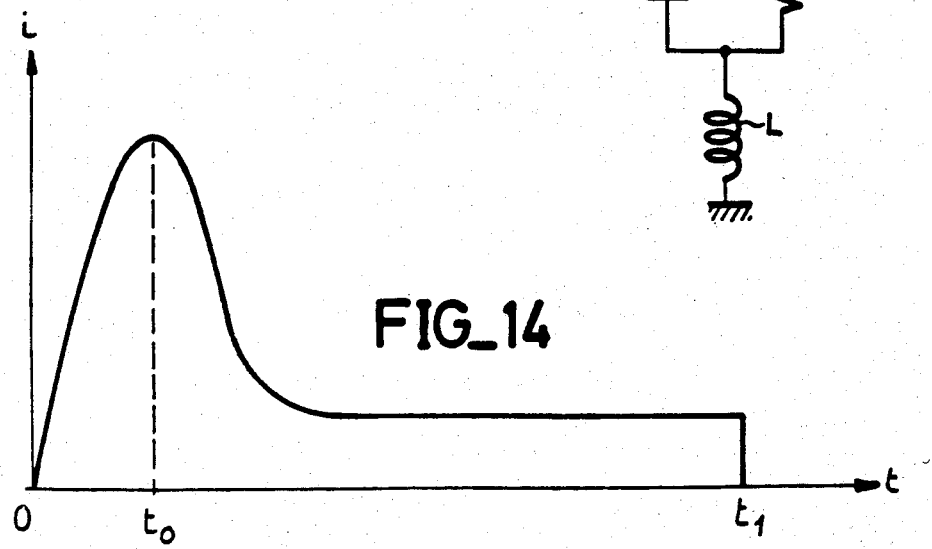
FIG_14

ELECTROMAGNETICALLY OPERATED OPTICAL SWITCH

BACKGROUND OF THE INVENTION

1. Field of the Invention

The present invention relates to an optical switch which can be used, for example, as an access coupler to a series bus.

2. Description of the Prior Art

An access coupler to a series bus is a system that permits picking up or injecting an optical signal in the line of a series bus so as to cause different terminals to communicate with one another. In the event of a terminal breakdown it must be possible to isolate the latter without thereby interrupting the line of the series bus.

French patent application No. 2,538,127 discloses an access coupler to a series bus with four branches, each one having means to receive or transmit light rays and a return device having two operating states. In its first state the return device reflects, and can return, the light between a first and a second branch on the one hand as well as between a third and a fourth branch on the other hand. In its second state the device passes light between the first and the fourth branch on the one hand as well as between the second and the third branch on the other hand. The return device, according to a first variation, is a removable mirror mounted on a support, mobile in translation between two positions: a first position in which the mirror is placed in the path of the light rays, and a second position for which the passage of the light rays is assured by two openings formed in the support. According to a second variation, the return device is a fixed mirror having the said operating states under the influence of a command device.

Although generally satisfactory, this access coupler has a number of disadvantages. Its response time in case of a terminal breakdown is not negligible. The same is true for insertion losses. The cross-talk between branches is not high enough. It would be desirable to provide a coupler which did not have these drawbacks.

SUMMARY OF THE INVENTION

In accordance with this invention, there is provided an optical switch between at least two channels of the type in which the path of a light beam can be modified by interposition in the path of a movable mirror whose displacement is commanded by electromagnetic means, characterized in that these means comprise an electromagnet which, under the influence of a command signal, permits the displacement of a slider supporting the mirror, and a magnetic circuit which permits the displacement of the slider at least in the zone of switching, which is parallel to a plane of reference.

In order to remedy the above drawbacks this invention proposes an optical four port switch whose return device is a mirror whose two faces are perfectly reflective and which is mounted on a support mobile in translation between two positions. In a first position, the mirror is disposed at the intersection of the optical beams. In a second position the mirror is outside the path of the light rays. The four branches of the four port switch are coplanar and perpendicular to one another. The movement of translation of the mirror is made along the axis perpendicular to the plane containing the four branches and passing at the point of intersection of the optical beams. A monostable or bistable electromagnetic device assures the displacement in translation of the mirror.

The slider will advantageously be movable in a slot in a support along one wall of the slot forming a plane of reference.

Preferably the slider support will be formed of two united elements, with the slot resulting from the assembly of the two elements. The slider support preferably also supports the magnetic circuit.

The slider can be equipped with a pole piece and can move along the plane of reference on ball bearings.

BRIEF DESCRIPTION OF THE DRAWINGS

FIGS. 1 and 2 are explanatory views of the working of an optical four port switch according to the invention.

FIGS. 3 to 7 represent various parts which are components of the switch.

FIGS. 8 and 9 illustrate the manner of assembling certain elements of the movable support.

FIG. 10 is a sectional view of the four port switch according to the invention.

FIGS. 11 and 12 are explanatory figures of the working of the four port switch.

FIG. 13 is a schematic of the command circuit of the movable support.

FIG. 14 is an explanatory diagram.

DESCRIPTION OF THE PREFERRED EMBODIMENTS

The working of the optical four port switch is illustrated by FIGS. 1 and 2. In these figures the theoretical four port switch is designated by the general reference 1. It comprises four branches A, B, C and D, coplanar and perpendicular to one another. Each one constitutes an optical transmission or reception channel. A mirror 2 is capable of being displaced in translation in a plane 3 perpendicular to the plane formed by branches A, B, C, D and forming an angle of 45° relative to them. The displacement of the mirror will preferably take place along an axis 4 elevated from the junction point of the four branches. When mirror 2 is actually at the junction point of these branches, an optical beam introduced by branch A will be returned toward branch B and vice versa. Likewise, an optical beam from branch C will exit through branch D and vice versa. This position of the mirror defines a first state of working and is represented in FIG. 1. In the second working state, represented in FIG. 2, the mirror 2 is tranlated so as to be placed outside the junction point of the branches. The propagation of the optical beams then takes place directly from branch A toward branch D and from branch C toward branch B.

The practical embodiment of such a switch must meet a certain number of conditions. In particular, the position in reflection of the mirror should be as precise as possible. The slightest angular flaw in positioning has a strong influence on the value of the losses of insertion in reflection. The mirror therefore must move and be held firmly on a plane of reference situated at 45° relative to the incidence of the optical beams. This constitutes one of the characteristics of the invention. Another characteristic of the invention is constituted by the mirror displacement device. The latter is actuated by an electromagnetic command which must be disconnected from the mirror or slider support when the mirror is performing its function; the reason for this is to avoid producing parasitic angular flaws that might alter the optical transmission in reflection.

FIG. 3 represents the slider support comprising a plane of reference P. Mirror 2 will be moved parallel to this plane of reference. The slider support is formed, for reasons of machining, of two assembled elements: a first element 5 comprising a semicylindrical part 6 whose axis of revolution is perpendicular to a cylindrical base 7, and a second element 8, likewise of semicylindrical form and attached to the first element 5. When elements 5 and 8 are assembled, element 8 and part 6 form a cylinder with a slot 9. This slot is not necessarily situated in the axis of the cylinder. But the mirror, whose thickness will be considered as negligible, will be situated in a plane parallel to the plane of reference P and passing thourgh the axis of revolution of the cylinder. Base 7 is provided with a slot which will serve for the orientation of the slider support, with the use of a screwdriver when it is placed in the four port switch.

The slider support also has bores 10 for passage of the light beams. The axes of these bores are therefore situated in a plane perpendicular to plane P and their point of intersection lies in the plane of the mirror. They define four right angles. The slider support also has two bores 11 situated in the element containing the plane of reference P, that is to say, element 5. Bores 11 open into plane P and their axes are preferably situated to bores 10. A groove 12, transverse to the semicylinder 6, unites the two bores 11.

Element 8 is assembled to element 5 by two centering feet that are introduced into hole 13 in the base and hole 14 in element 8. The final attachment of the two elements is assured by a screw introduced into the base through hole 15, this hole comprising the passage hole for the threaded rod and cavity lodging the screw head, and screwed into the threaded hole 16 in element 8. The centering feet make it possible to obtain substantially parallel faces for the slot 9.

Elements 5 and 8 will advantageously be made of nonmagnetic stainless steel.

FIGS. 4 and 5 are sectional views of FIG. 3. They permit a better understanding of FIG. 3. FIG. 4 corresponds to section B—B and FIG. 5 to secton A—A.

FIGS. 6 and 7 are front and profile views of the slider or mirror support which can be made of stainless steel or of some other nonmagnetic material. FIG. 7 is a view along a section H—H in FIG. 6. According to a preferred embodiment, slider 20 has the form of a disc pierced with a hole 21 which in this case is a port. The slider also comprises two flat areas 22 and 23 whose purpose will be explained below. It has a small hole 24 situated above port 21 and three blind holes 25 situated on the perimeter of disc 10. The axes joining the centers of holes 25 to the center of disc 20 form angles of 120° with one another. By construction, the parts of the slider in which holes 25 are foromed are situated in the same plane. These holes are calibrated and are adapted to receive ball bearings.

The slider represented in FIGS. 6 and 7 can be made in several parts for ease of construction.

The flat areas 22 and 23 are intended to support, respectively, a piece 30 called a pole piece and a mirror 31. FIGS. 8 and 9 correspond to the views of FIGS. 6 and 7. It can be seen how pole piece 30 and mirror 31 are mounted in this case. Mirror 31 is fixed on flat 23, for example by gluing. It can be formed of a sheet of mineral glass on which there is deposited, by vaporization in a vacuum, first an adhesion layer and then a film of gold. In this way a signal incident to the mirror is reflected to about 98%. For special uses of the four port switch, the mirror can be semireflecting. Pole piece 30 is glued or fixed on flat 22. It is advantageous that pole piece 30 have an elongate form as shown in FIG. 8. It is pierced with a circular window 32 whose center coincides with the center of disc 20 or provided with a cutout serving the same purpose.

The access coupling switch according to the invention has the general form represented in FIG. 10, which is a plan view in section. In order not to complicate the figure, the section of the slider support was made in two parts: on one side of slot 9 along axis A—A (see FIG. 3) to represent bores 10 and an optical path, on the other side of slot 9 along axis B—B to show the arrangement of the magnetic circuit.

The coupler comprises a body 40 serving as a support for the device. Its four faces 41 are machined so that two opposing faces are strictly parallel and two adjacent faces strictly perpendicular. Body 40 is pierced with a hole 42 whose axis is quite parallel to faces 41 on which are fixed the connection bases such as 43, with one base per face. Each base 43 is associated with a lens 44 for processing optical beams, located in a bore 45 in body 40. The position of the slider support in the body is such that bores 10 in the slider support correspond to the bores 45 in body 40. In the case of FIG. 10, the lenses are bar lenses adjustable in the plane perpendicular to the figure by known means. As mentioned above, the slider support can be adjusted in rotation in body 40 by means of a screwdriver blade driven by an angular micromanipulator.

In bores 11 of semicylinder 6, magnets 46 are located, which are advantageously chosen with very high magnetic energy and a wide demagnetizing field, for example of the samarium-cobalt type. One of these magnets is introduced by first engaging its north pole and the other by first engaging its south pole. A field-closing plate 47 is fixed in the groove 12 (see FIGS. 3 and 4) so as to channel the magnetic field induced by magnets 46. This plate is advantageously chosen of soft iron.

On one of the faces defining slot 9, two small nipples 48 have been provided, which are strips force-fitted in holes. These nipples, which are placed at the same level and symmetrically to the axis of hole 42, are intended to limit the translation of the slider. The slider is assembled as follows. It is first equipped with mirror 31, pole piece 30 and ball bearings 49. It is attached to a small-diameter cable (about 0.1 mm) introduced into the hole 24 (see FIGS. 8 and 9). The cable is attached to the slider by means of a loop with the two strands of the cable held by a ferrule, the cable being perhaps a single strand or a double strand. The slider is engaged in slot 9 on the side opposite nipples 48 by passing its cable between the nipples. It is in contact with the plane of reference P by the three ball bearings 49 and the plane defined by their contacts and containing the mirror is strictly parallel to the plane of reference. When pole piece 30 is at the level of the magnets 46 or in their vicinity, the magnetic flux is looped back. In this way the slider is held firmly on the plane of reference P. The form given to pole piece 30 permits an easy looping back of the magnetic flux. FIG. 8 shows, by reference 50, the employment of the magnets 46 when piece 30 is at their level. By its form and by the symmetrical disposition of magnets 46, the pole shoe constantly orients the mirror 31 in the same fashion relative to the point of convergence of the optical beams after each switching. The slider therefore possesses all possible degrees of freedom on the plane of reference P, the necessary orientations being given magnetically. The width of slot 9 is such that n no case can ball bearings 49 emerge from their lodging.

The working of the four port switch is explained by FIGS. 11 and 12 where there is shown the slider as represented in FIG. 9 and placed in slot 9 of the four port switch. Also represented are the electromagnetic means of command. The latter comprises an electromagnetic body 60 comprising an induction coil L, a piston 61 in the form of a T serving as a core for the electromagnet and a piece 62 to which is fixed cable 63 an axial hole which permits the displacement of piston 61 which is likewise pierced through its entire length to permit the passage of cable 63. A spring 64 is placed between body 60 and the horizontal branch of piston 61. This spring makes it possible, when the electromagnet is not energized, to disengage the piston from its lodging for a predetermined length. The electromagnetic means are fixed on a part of body 40 which is not shown.

In the operating state represented in FIG. 11, the electromagnet is energized, which has the effect of attracting the piston toward the center of the coil and compressing the spring 64 which is designed not to resist this action. The slider is then in lowered position and is centered between the two magnets 46. The length of cable 63 is such that in the position corresponding to this working state it is relaxed and limp. It will be noted as a matter of fact that piston 61 descends lower than piece 62. Mirror 31 is then in a position permitting the reflection of the incident rays. Furthermore, because of the magnetic circuit created by the magnets 46 and the particular form given to pole piece 30, mirror 31 will always be exactly in the same position when the electromagnet is energized.

In the operating state represented in FIG. 12, the electromagnet is no longer energized and spring 64 repels piston 61 since the force which it exerts on fixation piece 62 is superior to the force of attraction exerted by magnetx 46 on pole piece 30. But the stroke of piston 61 is limited by the presence of nipples 48 which stop the slider in translation. Since slider 20 has the form of a hisc and since the nipples 48 are placed symmetrically to this disc, the slider is always exactly in the same position in this working state. In this position the window 32 of pole piece 30 is at the intersection of branches A, B, C and D and the only possible optical paths are from A toward D (and vice versa) and from C toward B (and vice versa).

There is thus obtained a monostable working of the access coupler. In a terminal breakdown, the coil of the electromagnet is not excited, meaning that the optical beams transmit directly from A toward D and from C toward B. The terminal breakdown does not disturb the transmission of data. When the terminal is repaired, an electric order is sent to the coil of the electromagnet to restablish communication.

The switching time of such a system is identical to that of conventional electromechanical relays, but the advantage of the device according to the invention is the absence of rebound phenomena. As a matter of fact the plane containing the oscillations of the mirror as it is put in place is merged with its plane of reflection. For satisfactory working it is therefore sufficient that the mirror be large enough relative to the amplitude of the oscillations so that the reflection will not be interrupted as the mirror is put in place.

There will now be described how the slider is commanded electromagnetically. FIG. 13 is an electrical schematic of the command for the access coupler according to the invention. It responds in particular to the exigencies of rapidity of movement of the slider. The response time to the order given has to be very brief (about 5 ms) and it is necessary to provide a relatively substantial amount of energy to move the slider over a distance which is on the order of 3 mm. The command device represented in FIG. 13 comprises, between a direct voltage U and the ground, a breaker K, an RC circuit in parallel and coil L of the electromagnet. Breaker K has a mercury contact to prevent mechanical rebounds. The values of resistor R and capacitor C are calculated as a function of the value of the inductance L and the resistance of the coil. As breaker K is closed, capacitor C not being charged appears as a short circuit and the current i passing through the coil is limited only by the impedance of the latter. This is shown by FIG. 14 which is a diagram representing the current i in the coil L as a function of the time. Note the current peak due to the closing of breaker K. Then the capacitor becomes charged and the current in the coil diminishes. When the capacitor is charged, current i assumes a constant value which is much lower than that corresponding to the peak current and is a function of elements R and L in series. It is possible to obtain the current peak at the end of a time $t_o$ corresponding to about 1 ms, which corresponds to an instanteous power supplied of 80 W. The maintenance current necessary to keep the mirror in reflecting position is represented by the plane part of the curve. It corresponds to a power of 250 mW. At time $t_1$ the breaker is open to put the terminal out of service.

The system of switching according to the invention can be applied to other optical multiport switches. If the mirror is replaced by an opaque shutter there is obtained a function having a state "1 work" or "1 idle" in the case of a biport switch. The use of a fully reflecting mirror in the case of a three port switch permits the embodiment of the inverse function. It is also possible to combine n four port switch mounted on one another and to command them at the same time by a single electromagnet. It is also possible to combine two switches whose functions are directly reversed, the mirror being disposed in the place of the hole on one of the sliders, and thus obtain simultaneous changes of state by a single command.

It is quite evident that the device according to the invention lends itself to numerous variations.

What is claimed is:

1. An optical switch for use between at least tow channels of the type in which the path of a light beam can be modified by interposition in the path of a movable mirror whose displacement is commanded by electromagnetic means, characterized in that said means comprises:
    an electromagnet which, under the influence of a command signal, permits the displacement of a slider supporting said mirror, and
    a magnetic circuit permitting the displacement of said slider, at least in the zome of switching, parallel to a plane of reference.

2. An optical switch according to claim 1, characterized in that said switch is a four port switch.

3. An optical switch according to claim 1, characterized in that said slider is movable in a slot in a support along one wall of said slot forming said plane of reference.

4. An optical switch according to claim 3, characterized in that the displacement of said slider is limited by nipples mounted in said slider support.

5. An optical switch according to claim 4, characterized in that the displacement of said slider under the influence of said electromagnetic means is assured by means of a cable attached to it.

6. An optical switch according to claim 5, characterized in that said electromagnetic means comprises a coil provided with a core that can move under the influence of a command signal and a piece fixing the said cable in a first position.

7. An optical switch according to claim 6, characterized in that said fixation piece, in the absence of a command signal, is brought by a spring into a second position.

8. An optical switch according to claim 7, characterized in that said command signal is constituted by a voltage applied to the coil through a circuit formed of a resistor and a capacitor arranged in parallel.

9. An optical switch according to claim 3, characterized in that said slider support has bores for said optical channels.

10. An optical switch according to claim 9, characterized in that said slider support is formed of two connected elements, and said slot results from the assembly of these two elements.

11. An optical switch according to claim 10, characterized in that said support and said slider are made of a nonmagnetic material.

12. An optical switch according to claim 11, characterized in that said slider support also supports said magnetic circuit.

13. An optical switch according to claim 3 characterized in that said magnetic circuit comprises at least one magnet located in the part of said slider support comprising said plane of reference.

14. An optical switch according to claim 13, characterized in that said magnetic circuit comprises two magnets and that magnetic looping is assured on the side opposite said plane of reference by a closure plate.

15. An optical switch according to claim 1, characterized in that said slider has the form of a disc pierced with a port.

16. An optical switch according to claim 15, characterized in that said slider also supports a pole shoe having an aperture therein.

17. An optical switch according to claim 16, characterized in that said slider is movable along said plane of reference on ball bearings located in blind holes in said slider.

* * * * *